(12) United States Patent
Kyoung

(10) Patent No.: US 9,505,308 B2
(45) Date of Patent: Nov. 29, 2016

(54) ELECTRIC VEHICLE BATTERY MANAGEMENT

(71) Applicant: KT CORPORATION, Gyeonggi-do (KR)

(72) Inventor: Jin-Soo Kyoung, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 131 days.

(21) Appl. No.: 14/184,928

(22) Filed: Feb. 20, 2014

(65) Prior Publication Data

US 2014/0232356 A1    Aug. 21, 2014

(30) Foreign Application Priority Data

Feb. 21, 2013 (KR) .................. 10-2013-0018459

(51) Int. Cl.
| | | |
|---|---|---|
| *B60L 11/18* | (2006.01) | |
| *B60L 3/00* | (2006.01) | |
| *B60L 3/12* | (2006.01) | |

(52) U.S. Cl.
CPC .............. B60L 3/0046 (2013.01); B60L 3/12 (2013.01); B60L 11/1857 (2013.01); B60L 11/1862 (2013.01); *B60L 2200/12* (2013.01); *B60L 2240/547* (2013.01); *B60L 2240/549* (2013.01); *B60L 2240/70* (2013.01); *Y02T 10/705* (2013.01); *Y02T 10/7005* (2013.01); *Y02T 10/7044* (2013.01); *Y02T 10/7291* (2013.01); *Y02T 90/16* (2013.01)

(58) Field of Classification Search
CPC .............. B60L 3/0046; B60L 11/1862; B60L 11/1857; B60L 3/12; B60L 2240/547; B60L 2240/70; B60L 2240/549; B60L 2200/12; Y02T 90/16; Y02T 10/7291; Y02T 10/705; Y02T 10/7005; Y02T 10/7044

See application file for complete search history.

(56) References Cited

U.S. PATENT DOCUMENTS

| | | | | |
|---|---|---|---|---|
| 5,444,378 A * | 8/1995 | Rogers | ............... | G01R 31/3613 320/136 |
| 7,051,236 B2 * | 5/2006 | Sanu | .................. | G06F 1/24 713/340 |
| 7,629,773 B2 * | 12/2009 | Eberhard | ................ | H02J 7/045 320/104 |
| 7,632,212 B2 * | 12/2009 | Yamanaka | ............... | B60K 6/40 477/107 |
| 8,022,674 B2 * | 9/2011 | Miura | ................... | B60W 20/00 180/65.29 |
| 8,232,875 B2 * | 7/2012 | Uchida | ................. | H01M 10/42 320/104 |
| 8,428,804 B2 * | 4/2013 | Sakai | ........................ | B60L 1/00 180/65.28 |
| 8,497,686 B2 * | 7/2013 | Hoshino | ................ | G06Q 30/06 320/132 |
| 8,536,825 B2 * | 9/2013 | Kishiyama | ............ | H02J 7/0073 180/65.29 |
| 8,616,321 B2 * | 12/2013 | Aoki | ........................ | B62M 6/45 180/206.1 |
| 8,712,619 B2 * | 4/2014 | Kusumi | ................... | B60K 6/46 180/2.2 |
| 2010/0007481 A1 * | 1/2010 | Uchida | ................. | H01M 10/42 340/455 |
| 2010/0121588 A1 * | 5/2010 | Elder | ..................... | H01M 10/48 702/63 |
| 2010/0131139 A1 * | 5/2010 | Sakai | ........................ | B60K 6/46 701/22 |
| 2010/0280700 A1 * | 11/2010 | Morgal | .................. | G06Q 10/02 701/31.4 |

(Continued)

FOREIGN PATENT DOCUMENTS

| | | |
|---|---|---|
| JP | 08-140205 A | 5/1996 |
| JP | 2012-164210 A | 8/2012 |

(Continued)

*Primary Examiner* — Naum B Levin
(74) *Attorney, Agent, or Firm* — IP Legal Services, LLC

(57) ABSTRACT

The disclosure is related to a battery management of an electric vehicle. Particularly, the disclosure relates to performing the battery management according to a 'state of charge' (SOC) management condition predetermined for an electric vehicle battery.

13 Claims, 6 Drawing Sheets

(56) References Cited

U.S. PATENT DOCUMENTS

| | | | | |
|---|---|---|---|---|
| 2011/0050239 A1* | 3/2011 | Hoshino | G01R 31/3679 | 324/435 |
| 2011/0156641 A1* | 6/2011 | Kishiyama | H02J 7/0073 | 320/109 |
| 2011/0156652 A1* | 6/2011 | Kishiyama | B60L 11/1824 | 320/132 |
| 2012/0041855 A1* | 2/2012 | Sterling | B60L 3/0046 | 705/34 |
| 2012/0133333 A1* | 5/2012 | Morioka | H01M 10/441 | 320/134 |
| 2013/0002207 A1* | 1/2013 | Wenger | H02J 7/34 | 320/152 |
| 2013/0009764 A1* | 1/2013 | Yamamoto | B60L 11/1861 | 340/449 |
| 2013/0015814 A1* | 1/2013 | Kelty | B60L 3/0046 | 320/109 |
| 2013/0027048 A1* | 1/2013 | Schwarz | H01M 10/44 | 324/427 |
| 2013/0124029 A1* | 5/2013 | Izumi | B60K 6/445 | 701/22 |
| 2013/0162221 A1* | 6/2013 | Jefferies | B60L 11/1816 | 320/155 |
| 2013/0238180 A1* | 9/2013 | Bold | B60H 1/00278 | 701/22 |
| 2013/0257387 A1* | 10/2013 | Yokoyama | H02J 7/044 | 320/137 |
| 2014/0129164 A1* | 5/2014 | Gorbold | G01R 31/362 | 702/63 |
| 2014/0203077 A1* | 7/2014 | Gadh | H02J 7/00 | 235/382 |

FOREIGN PATENT DOCUMENTS

| | | |
|---|---|---|
| KR | 10-0949260 B1 | 3/2010 |
| KR | 10-2011-0017649 A | 2/2011 |
| KR | 10-2012-0047100 A | 5/2012 |
| KR | 10-2012-0075010 A | 7/2012 |

* cited by examiner

| Option Type | SOC management condition | Incentive Provider |
|---|---|---|
| Option 1 | 20~80% | EV Charging Station Operator |
| Option 2 | 70~100% | EV Insurance Provider |
| Option 3 | 50~90% | Battery Manufacturer |
| Option 4 | 10~90% | Used EV Business Operator |

ELECTRIC VEHICLE BATTERY MANAGEMENT

CROSS REFERENCE TO PRIOR APPLICATIONS

The present application claims priority under 35 U.S.C. §119 to Korean Patent Application No. 10-2013-0018459 (filed on Feb. 21, 2013), which is hereby incorporated herein by reference in its entirety.

TECHNICAL FIELD

The present disclosure relates to a battery management of an electric vehicle and, in particular, to performing the battery management according to a 'state of charge' (SOC) management condition predetermined for an electric vehicle battery.

BACKGROUND

An electric vehicle moves by rotating its motor using electricity stored in a battery. Such electric vehicle was developed before of the development of a typical vehicle using an internal combustion engine. However, practical limitations of the electrical vehicle caused by the weight and the time required to charge its battery hindered the full commercialization of the electric vehicle. But, the environmental concerns of using the internal combustion engine have revitalized a further development of the electric vehicle.

The electric vehicle is similar to other typical vehicles with internal combustions engines except that it employs an electric motor instead of a combustion engine. Particularly, the electric vehicle has an advantage over the typical vehicle with an internal combustion engine in that unlike the typical vehicles which requires to be at a particular place (e.g., a gas station) to be refilled with its energy source (e.g., gasoline), the electric vehicle can be charged at any place that has an electric outlet, such as a home or a parking lot.

Accordingly, electric vehicle users may have flexibility when it comes to charging their vehicles. The electric vehicle users may charge their electric vehicles in accordance with their own schedule. For example, the users may decide to charge their vehicles while they are at home or at work, shopping, or watching movies. However, when the users are not careful with charging their vehicles, there may be a circumstance in which the battery is completely discharged. In order to prevent such complete discharge of the battery, the users are inclined to charge their electric vehicles full or to a certain level.

However, the way the battery is charged and how often the battery is charged may affect the performance of the battery. Different types of batteries have different characteristics on how they need to be charged and how they are discharged. Thus, electric vehicle users may accidentally lower the performance or shorten the life-cycle of the battery through an improper charging method. Sometimes, the users may increase the risk of damaging the battery when they try to access and manipulate the battery for a different use. Therefore, if the battery is treated in a way that it negatively affects the condition of the battery, there can be losses to manufacturing or to the management of the battery since there is no correct standard for determining how the battery has been treated.

Furthermore, losses might occur when providing a charging service to electric vehicle users when the charging is not achieved efficiently. Typically, when an electric vehicle is charged to a certain level, the charging speed is reduced until the battery is fully charged. This is inefficient for entities that provide a charging service, and this inefficiency may incur losses. In other words, a variety of business operators (or business entities) associated with an electric vehicle have financial interests in how the electric battery is treated. Accordingly, a proper management of an electric vehicle battery may be required.

SUMMARY

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present embodiment, an electric vehicle battery management may be performed according to a satisfaction of a 'state of charge' (SOC) management condition predetermined for a corresponding electric vehicle battery.

In accordance with at least one embodiment, a method may be provided for managing an electric vehicle battery. The method may include predetermining a management condition associated with a state of charge (SOC) of the electric vehicle battery, collecting SOC information of the electric vehicle battery from an electric vehicle terminal, determining whether the SOC information satisfies the predetermined SOC management condition, and performing an battery management according to the determination result.

The predetermining may include providing at least one SOC option information to the user equipment, receiving selection information from the user equipment, and determining the management condition as an SOC management condition corresponding to a selected SOC option.

The at least one SOC option information may be determined based on at least one of a driving pattern and a battery management pattern of a corresponding user.

The battery management pattern may be determined based on a corresponding SOC management history.

The management condition may be an allowable range of the SOC.

The performing may include creating a battery management guide information when the SOC management condition is not satisfied, and transmitting the battery management guide information to at least one of user equipment and the electric vehicle terminal.

The battery management guide information may include at least one of a charge start SOC and a charge end SOC associated with the electric vehicle battery.

The performing may include creating an SOC management evaluation information by comparing the collected SOC information and the predetermined SOC management condition, and transmitting the SOC management evaluation information to a corresponding business operator system.

The creating the SOC management evaluation information may include creating SOC history information by analyzing the collected SOC information, determining a conformity degree between the SOC history information and a corresponding SOC management condition, and creating the SOC management evaluation information based on the conformity degree.

The SOC history information may include information on at least one of a charge start SOC and a charge end SOC.

The determining the conformity degree may include determining the conformity degree based on at least one of (i) whether the SOC history information is within an SOC range corresponding to the predetermined SOC management condition, (ii) a proximity degree between charge start SOCs, and (iii) a proximity degree between charge end SOCs.

The creating the SOC management evaluation information may be performed at least one of (i) at a predetermined period and (ii) when a request is received from the corresponding business operator system.

The method may further include determining at least one of an incentive and a penalty for a corresponding user according to the conformity degree, and transmitting the at least of the incentive and the penalty, to at least one of the corresponding business operator system and the user equipment.

In accordance with other embodiments, an apparatus may be provided for managing an electric vehicle battery. The apparatus may include a management condition determining processor, an SOC information collecting processor, and an SOC management processor. Herein, the management condition determining processor may be configured to predetermine a management condition associated with a state of charge (SOC) of the electric vehicle battery. The SOC information collecting processor may be configured to collect SOC information of the electric vehicle battery from an electric vehicle terminal. The SOC management processor may be configured to create at least one of a battery management guide information and an SOC management evaluation information by comparing the SOC information and the SOC management condition.

The apparatus may further include an information providing processor configured (i) to transmit the battery management guide information to at least one of user equipment and the electric vehicle terminal, and (ii) to transmit the SOC management evaluation information to a corresponding business operator system.

The battery management guide information may include at least one of a charge start SOC and a charge end SOC associated with the electric vehicle battery. The battery management guide information may be created when the SOC information does not satisfy the SOC management condition.

The SOC management processor may be configured to create SOC history information by analyzing the SOC information, to determine a conformity degree between the SOC history information and a corresponding SOC management condition, and to create the SOC management evaluation information based on the conformity degree.

The SOC history information may include information on at least one of a charge start SOC and a charge end SOC.

The conformity degree may be determined based on at least one of (i) whether the SOC history information is within an SOC range corresponding to the SOC management condition, (ii) a proximity degree between charge start SOCs, and (iii) a proximity degree between charge end SOCs.

BRIEF DESCRIPTION OF THE DRAWINGS

The above and/or other aspects of some embodiments of the present invention will become apparent and more readily appreciated from the following description of embodiments, taken in conjunction with the accompanying drawings, of which.

DETAILED DESCRIPTION OF EMBODIMENTS

Figure 1:
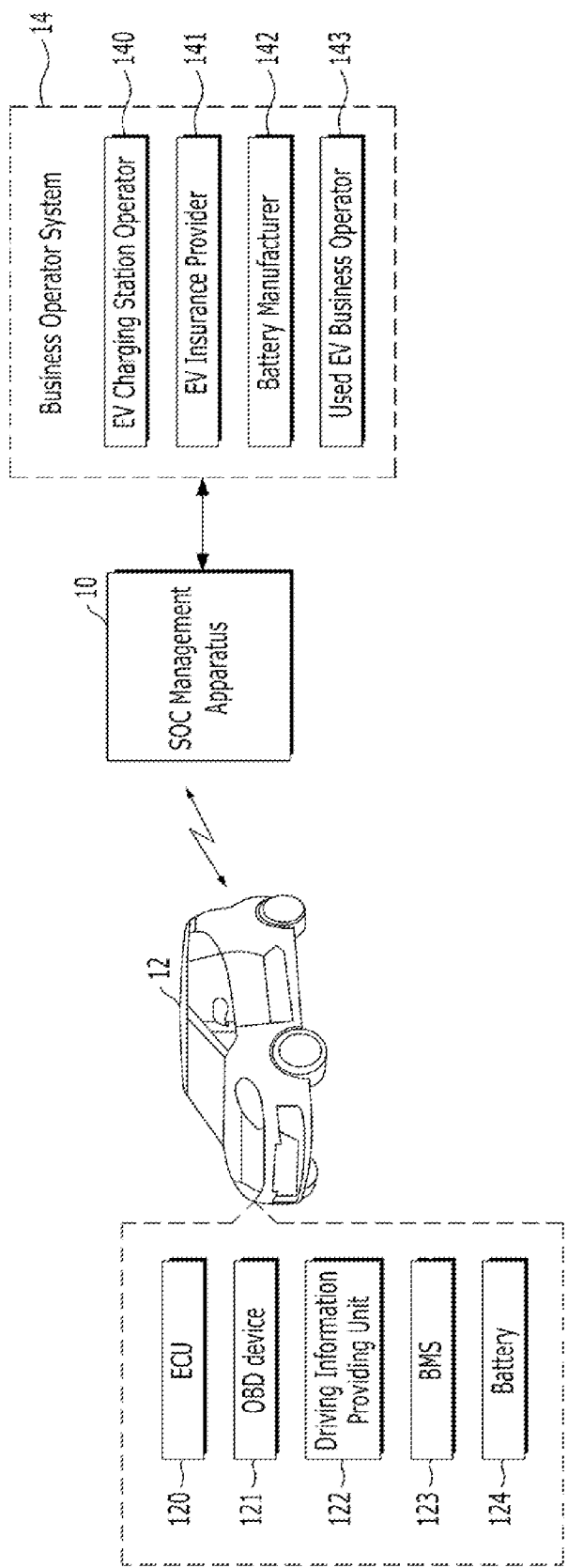
FIG. 1 illustrates a system for performing an electric vehicle battery management in accordance with at least one embodiment.

Reference will now be made in detail to exemplary embodiments of the present invention, examples of which are illustrated in the accompanying drawings, wherein like reference numerals refer to like elements throughout. The embodiments are described below, in order to explain embodiments of the present invention by referring to the figures.

The present embodiment may manage a state of charge (SOC) of an electric vehicle battery. Particularly, the present embodiment may manage an electric vehicle battery based on a 'state of charge' (SOC) management condition predetermined for a corresponding electric vehicle battery.

FIG. 1 illustrates a system for performing an electric vehicle battery management in accordance with at least one embodiment.

As shown in FIG. 1, 'a system for performing an electric vehicle (EV) battery management' (hereinafter referred to as "an EV battery management system") according to the present embodiment may include SOC management apparatus 10 and an electric vehicle terminal (not shown in FIG. 1) installed (or included) in an electric vehicle (e.g., 12). Particularly, the EV battery management system may interwork with a variety of types in business operator system 14.

SOC management apparatus 10 may manage an electric vehicle battery based on an SOC management condition predetermined for a corresponding electric vehicle battery. More specifically, SOC management apparatus 10 may (i) predetermine the SOC management condition (i.e., a management condition associated with an SOC of the electric vehicle battery) according to a user selection, (ii) receive (or collect) SOC information (e.g., a remaining battery power amount) of the electric vehicle battery from the electric vehicle terminal, (iii) determine whether the SOC management condition is satisfied, based on the received SOC information, and (iv) determine incentives for a corresponding EV user when the SOC management condition is satisfied. Typically, The SOC may be stated as a percentage. The SOC management apparatus 10 and operations thereof are described in more detail with reference to FIG. 2, and FIG. 4 to FIG. 10.

Figure 2:
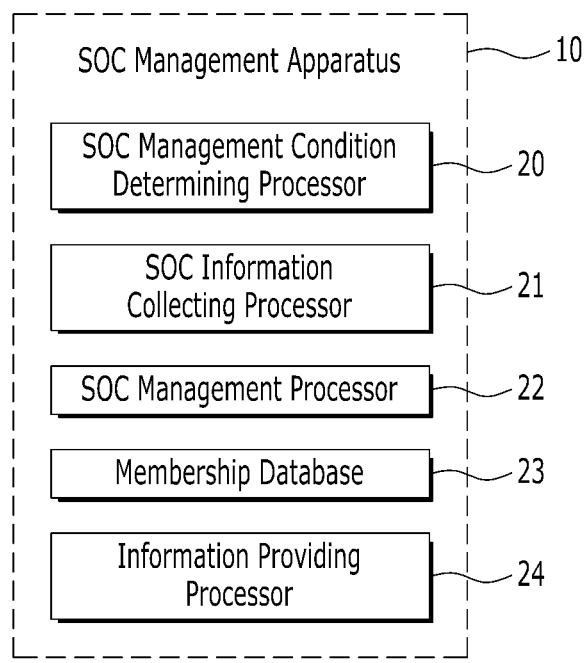
FIG. 2 is a block diagram illustrating a detailed structure of an SOC management apparatus in accordance with at least one embodiment.

Electric vehicle 12 may include a variety of devices associated with management and/or operations (e.g., a driving operation) of a corresponding electric vehicle. For example, as shown in FIG. 2, electric vehicle 12 may include at least one of electric control unit (ECU) 120, on-board diagnostics (OBD) device 121, driving information providing unit 122, battery management system (BMS) 123, and battery 124.

Herein, ECU 120 may control and manage each of devices installed in electric vehicle 12. OBD device 121 may store operation information (e.g., a driving operation) of electric vehicle 12. Driving information providing unit 122 may provide guide information for driving of electric vehicle 12, and transmit a variety of operation information associated with electric vehicle 12 to other outer systems. For example, a navigation system may be included in driving information providing unit 122. BMS 123 may manage a battery (e.g., 124) of electric vehicle 12. Battery 124 may correspond to a power source of electric vehicle 12, and may store an electric energy to be used for operations (e.g., a driving operation) of electric vehicle 12. Furthermore, battery 124 of electric vehicle 1 may be a rechargeable battery.

Figure 3:
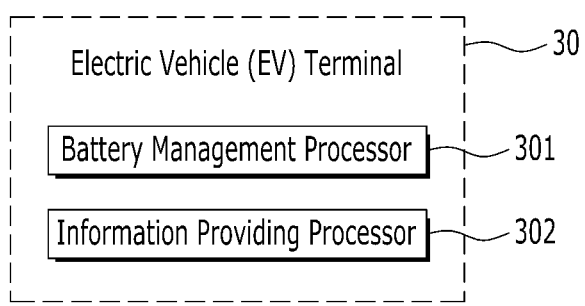
FIG. 3 is a block diagram illustrating an electric vehicle terminal associated with an electric vehicle in accordance with at least one embodiment.

The present embodiment may perform an SOC management (e.g., a management of a remaining battery power amount) using a variety of typical devices (or existing devices) installed (or included) in electric vehicle 12, as described above. Alternatively, an apparatus for performing an SOC management may be newly included in electric vehicle 12. With respect to an SOC management in electric vehicle 12, (i) typical devices (or existing devices) used for the SOC management and/or (ii) a new SOC management apparatus may be referred to as "an electric vehicle terminal," and may be functionally expressed as shown in FIG. 3.

Electric vehicles (EVs) may include electric cars (e.g., 12), electric motorcycles, and/or electric motorbikes, but are not limited thereto.

Meanwhile, business operator system 14 may be a management system operated by a variety of business operators (may be referred to as "business entities") associated with an electric vehicle and/or an electric vehicle battery. Herein, business operators associated with an electric vehicle battery may include EV charging station operator 140, EV insurance provider 141, battery manufacturer 142, and/or used EV business operator 143, but are not limited thereto. Particularly, the business operators associated with the electric vehicle and/or the EV battery may have financial interests in a management of an electric vehicle battery. For example, financial gains of EV charging station operator 140 may differ according to a battery charging time of an electric vehicle. EV insurance provider 141 may make a loss due to a damage of an electric vehicle battery. Battery manufacturer 142 and used EV business operator 143 may have financial interests in a management of an electric vehicle battery because they have to give a warranty for a specific period.

FIG. 2 is a block diagram illustrating a detailed structure of an SOC management apparatus in accordance with at least one embodiment.

As shown in FIG. 2, SOC management apparatus 10 according to the present embodiment may include at least one of SOC management condition determining processor 20, SOC information collecting processor 21, SOC management processor 22, membership database 23, and information providing processor 24.

SOC management condition determining processor 20 may configure at least one SOC option for managing an electric vehicle battery. Particularly, in the case that there are a plurality of business operators (i.e., business entities), a plurality of SOC options may be configured based on a desired requirement (e.g., an electric charging condition) per business operator. In this case, each SOC option may include a corresponding SOC management condition and/or incentive information. An SOC management condition and/or an incentive may differ according to option types. Such configuration of the SOC options will be described in more detail with reference to FIG. 5 and FIG. 8.

Figures 7, 8:
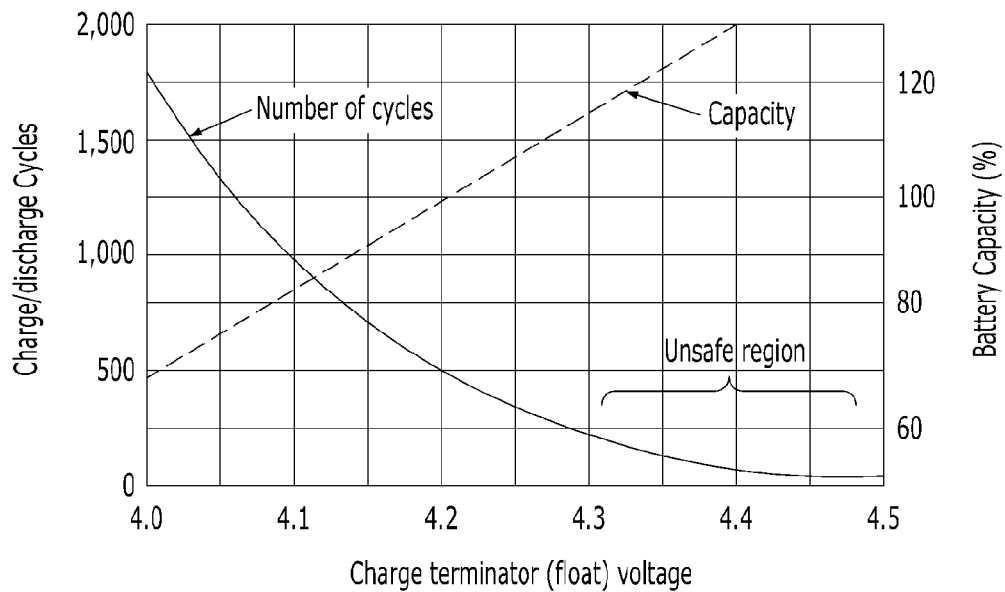
FIG. 7 is a graph illustrating a battery performance according to the number of charge/discharge cycles.
FIG. 8 illustrates an example of SOC options in accordance with at least one embodiment.

Furthermore, SOC management condition determining processor 20 may determine an SOC management condition for each EV user. More specifically, SOC management condition determining processor 20 may provide at least one of SOC options to each EV user. Herein, the EV user may be a subscriber of an SOC management service. When each EV user receives SOC option information, each EV user may select one SOC option. SOC management condition determining processor 20 may determine an SOC management condition based on an SOC option selected by an EV user. For example, if an EV user selects "Option 1," SOC management condition may be set to 20% to 80% as shown in FIG. 8. In this case, the EV user may be required to manage an electric vehicle (EV) battery such that an SOC (i.e., a remaining battery power amount) of a corresponding EV battery is within from 20% to 80%.

In other embodiments, SOC management condition determining processor 20 may recommend one or more SOC options suitable for a corresponding EV user. More specifically, SOC management condition determining processor 20 may recommend one or more suitable SOC options, based on at least one of (i) a driving pattern (e.g., an average driving distance, etc.) and (ii) a battery management pattern of a corresponding EV user.

SOC information collecting processor 21 may collect and store in real time or periodically SOC information (e.g., SOC values) from a corresponding EV terminal (e.g., 30). In other embodiments, SOC information collecting processor 21 may create SOC history information by analyzing the collected SOC information. Such EV terminal providing SOC information will be described in more detail with reference to FIG. 3.

SOC management processor 22 may determine whether the collected SOC information (e.g., an SOC value) satisfies a corresponding SOC management condition, i.e., whether the collected SOC value is within a range of SOC corresponding to the SOC management condition. When the collected SOC information (e.g., an SOC value) does not satisfy the corresponding SOC management condition, i.e., when the collected SOC value exceeds a range of SOC corresponding to the SOC management condition, SOC management processor 22 may create battery management guide information, and send the battery management guide information to at least one of (i) electric vehicle (EV) 12 (more specifically, EV terminal 30) and (ii) user equipment. Herein, the battery management guide information may include electric charging guide information including a charge start SOC and/or a charge end SOC.

In other embodiments, although the collected SOC value is within a range of SOC corresponding to an SOC management condition, SOC management processor 22 may further determine whether the collected SOC value is close to a lower limit value (i.e., a minimum SOC value) or a upper limit value (i.e., a maximum SOC value) of a range of SOC corresponding to the SOC management condition. When the collected SOC value is close to the lower limit value or the upper limit value, SOC management processor 22 may create a battery management guide information, and send the battery management guide information to at least one of (i) electric vehicle (EV) 12 (more specifically, EV terminal 30) and (ii) user equipment. For example, in the case that a range of SOC corresponding to the SOC management condition is from 20% to 80%, when a collected SOC value is 23% close to the lower limit value (e.g., 20%), or 78% close to the upper limit value (e.g., 80%), SOC management processor 22 may create a battery management guide information.

Furthermore, SOC management processor 22 may retrieve SOC information from membership database 23, and create SOC history information based on the retrieved SOC information. Herein, the SOC history information may include a battery charging history including information on a charge start SOC and/or a charge end SOC. SOC management processor 22 may determine a conformity degree between SOC history information and a corresponding SOC management condition, and create SOC management evaluation information associated with a corresponding electric vehicle (EV), based on the determination result (i.e., conformity degree).

Membership database 23 may store user information (e.g., user identification, contact information, etc.), business operator information, electric vehicle information, option information (i.e., information on an option selected by a user), SOC management condition information (may be included in the option information), SOC information (i.e., SOC information collected from EV terminal 30), SOC history information, SOC management evaluation information, and/or incentive/penalty information.

Information providing processor 24 may provide a variety of information stored in membership database 23, at least one of: (i) at a predetermined time, (ii) when an information request is received from an EV user, and (iii) when an information request is received from a related business operator. For example, information providing processor 24 may provide SOC management evaluation information to business operator system 14. Information providing processor 24 may provide incentive information (or penalty information) to user equipment.

FIG. 3 is a block diagram illustrating an electric vehicle terminal associated with an electric vehicle in accordance with at least one embodiment.

As shown in FIG. 3, electric vehicle (EV) terminal 30 may include battery management processor 301 and information providing processor 302.

Battery management processor 301 may create SOC information by measuring a remaining battery power amount of a corresponding electric vehicle. Herein, a measurement of the remaining battery power amount may be performed in real time, periodically, or whenever an event occurs. Battery management processor 301 may interwork with BMS 123 installed in electric vehicle 12. Alternatively, battery management processor 301 may include (i) functions of BMS 123 or (ii) BMS 123 itself as a constituent element.

Information providing processor 302 may provide (e.g., transmit) the created SOC information to SOC information collecting processor 21 of SOC management apparatus 10. Herein, information providing processor 302 may transmit the created SOC information by interworking with other devices having a communication function. For example, information providing processor 302 may interwork with other devices with a communication function such as a telematics device, a navigation system, and/or OBD device 121. Alternatively, information providing processor 302 may independently include communication functions. In other embodiments, information providing processor 302 may include at least of the other devices with a communication function, as a constituent element.

Meanwhile, information providing processor 302 may receive battery management guide information from SOC management apparatus 10. When receiving the battery management guide information from SOC management apparatus 10, information providing processor 302 may transfer the received battery management guide information to battery management processor 301. Battery management processor 301 may display the battery management guide information in order to induce a user to observe a corresponding SOC management condition.

Figure 4:
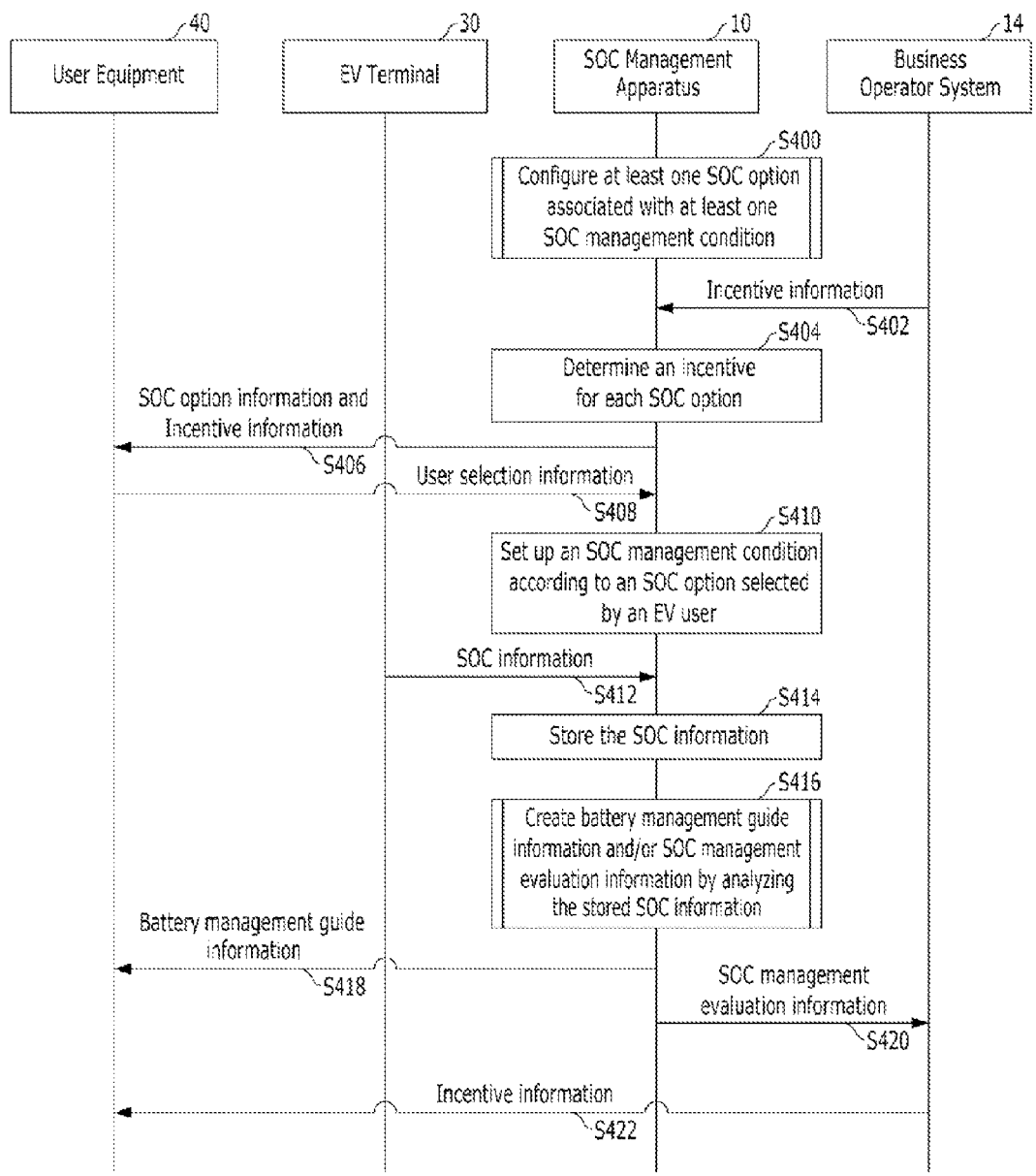
FIG. 4 illustrates a method of performing an electric vehicle battery management in accordance with at least one embodiment.

FIG. 4 illustrates a method of performing an electric vehicle battery management in accordance with at least one embodiment.

Referring to FIG. 4, at step S400, SOC management apparatus 10 may configure at least one SOC option associated with at least one SOC management condition. More specifically, SOC management apparatus 10 may determine at least one SOC management condition based on requirement information per each business operator. SOC management apparatus 10 may configure at least one SOC option associated with the at least one SOC management condition. Such SOC option configuration will be described in more detail with reference to FIG. 5.

At step S402, SOC management apparatus 10 may receive incentive information from each of business operator systems 14 (or each business operator) associated with an electric vehicle or an electric vehicle battery. Herein, the incentive information may include an extension of a battery warranty term, a higher price of an used electric vehicle, a lower price of an EV battery insurance, and so forth.

At step S404, when receiving incentive information from each business operator system 14, SOC management apparatus 10 may determine an incentive for each SOC option. In other embodiments, SOC options may include corresponding incentive information.

At step S406, SOC management apparatus 10 may provide SOC option information and/or incentive information to user equipment 40. For example, SOC management apparatus 10 may provide Option 1 through Option 4 shown in FIG. 8. In other embodiments, SOC management apparatus 10 may provide (i.e., recommend) one or more SOC options suitable to a corresponding EV user, based on at least one of (i) a driving pattern (e.g., an average driving distance) and (ii) a battery management pattern of a corresponding EV user. Herein, the battery management pattern may be determined based on a corresponding SOC management history. More specifically, SOC management apparatus 10 may collect SOC information associated with a corresponding EV battery, and determine the battery management pattern associated with a corresponding EV battery by analyzing the collected SOC information (especially, a charge start SOC and/or a charge end SOC, etc.).

An electric vehicle user may select a specific SOC option (e.g., Option 1) from SOC option information. In this case, at step S408, user equipment 40 may transmit user selection information to SOC management apparatus 10.

At step S410, SOC management apparatus 10 may set up an SOC management condition according to an SOC option selected by an EV user. For example, in the case that the EV user selects Option 1 of FIG. 8, the SOC management condition may be set to a range of 20% to 80%.

Thereafter, the EV user may operate a corresponding electric vehicle, and charge the electric vehicle. At step S412, electric vehicle (EV) terminal 30 may obtain SOC information associated with a corresponding EV battery in real time, periodically, or whenever an event (e.g., a request of SOC management apparatus 10) occurs, and transmit the SOC information to SOC management apparatus 10.

At step S414, when receiving the SOC information from a corresponding electric vehicle (more specifically, electric vehicle terminal 30), SOC management apparatus 10 may store and manage the received SOC information.

At step S416, SOC management apparatus 10 may create battery management guide information and/or SOC management evaluation information by analyzing the stored SOC information. Such creation procedure of the battery management guide information and/or the SOC management evaluation information will be described in more detail with reference to FIG. 9 and FIG. 10.

At step S418, SOC management apparatus 10 may transmit the battery management guide information to user equipment 40. Alternatively, SOC management apparatus 10 may transmit the battery management guide information to electric vehicle (EV) 12 (more specifically, EV terminal 30). In summary, SOC management apparatus 10 may transmit the battery management guide information to at least one of (i) electric vehicle (EV) 12 (more specifically, EV terminal 30) and (ii) user equipment.

At step S420, SOC management apparatus 10 may transmit the SOC management evaluation information to business operator system 14. In other embodiments, SOC management apparatus 10 may determine an incentive (or penalty) to be given an EV user, based on the SOC management evaluation information. In this case, SOC management apparatus 10 may transmit the incentive information (or penalty information) to at least one of business operator system 14 and user equipment 40.

At step S422, when receiving the SOC management evaluation information from SOC management apparatus 10, business operator system 14 may determine an incentive to be given to an EV user, based on the SOC management evaluation information, and provide corresponding incentive information to user equipment 422. Meanwhile, business operator system 14 may give a penalty according to the SOC management evaluation information. In other embodiments, in the case that business operator system 14 receives incentive information (or penalty information) from SOC management apparatus 10, business operator system 14 may provide the received incentive information (or penalty information) to user equipment 422.

Figure 5:
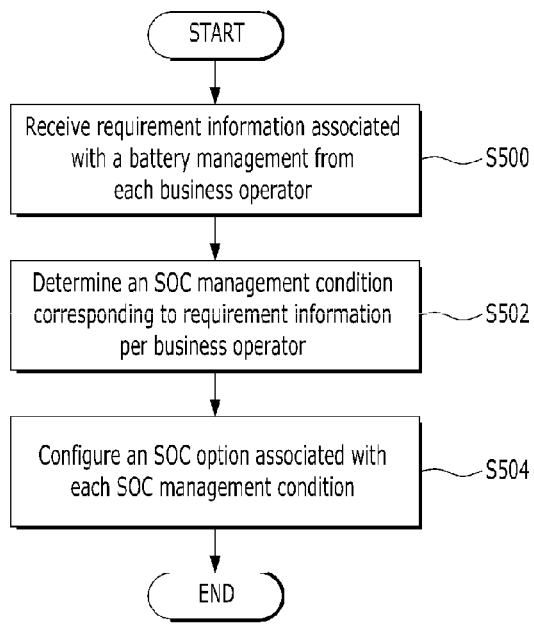
FIG. 5 illustrates a method of configuring SOC options for an electric vehicle battery management in accordance with at least one embodiment.

FIG. 5 illustrates a method of configuring SOC options for an electric vehicle battery management in accordance with at least one embodiment. For example, such SOC option configuration method may be performed in SOC management apparatus 10.

Referring to FIG. 5, at step S500, SOC management apparatus 10 may receive requirement information (e.g., an electric charging condition including a charge start SOC and a charge end SOC, etc.) associated with an EV battery management, from each business operator. Business operators may analyze business profits associated with electric vehicle batteries, and provide management requirement information (i.e., requirement information associated with an EV battery management) determined based on analysis results to SOC management apparatus 10. For example, as described later, different business operators associated with electric vehicles may have different interests. Accordingly, desired requirements and management conditions associated with an SOC management of electric vehicles may differ according to business operators.

At step S502, SOC management apparatus 10 may determine an SOC management condition corresponding to requirement information per business operator. For example, as shown in FIG. 8, in the case that a business operator associated with an electric vehicle is EV charging station operator 140, the SOC management condition may be set to a range of 20% to 80%.

At step S504, SOC management apparatus 10 may configure at least one SOC option associated with each SOC management condition. Examples of the SOC options may be described in more detail with reference to FIG. 8.

Figure 6:
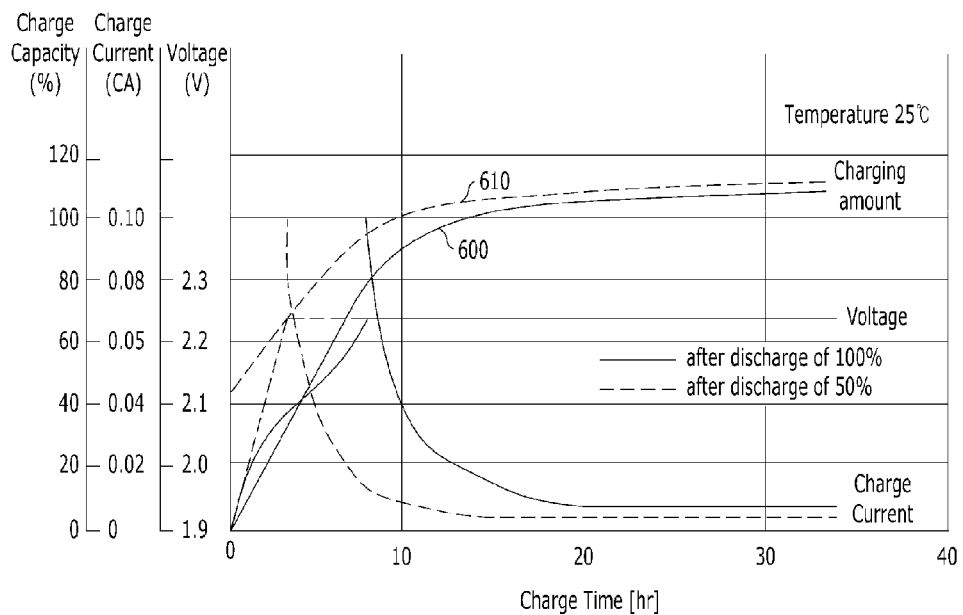
FIG. 6 is a graph illustrating an electric charging efficiency according to a charging condition of an electric vehicle battery.

FIG. 6 is a graph illustrating an electric charging efficiency according to a charging condition of an electric vehicle battery.

As shown in FIG. 6, solid lines (e.g., 600) represent a case (hereinafter referred to as "Case 1") that an electric charging procedure of an electric vehicle battery is performed after a full discharge (i.e., discharge of 100%). Broken lines (e.g., 610) represent a case (hereinafter referred to as "Case 2") that an electric charging procedure of the electric vehicle battery is performed after discharge of 50%. With respect to charging states for initial 10 hours (i.e., 10 hours after an electric charging process starts), a charging amount (see the graph "600") of Case 1 is much than a charging amount (see the graph "610") of Case 2. As shown in FIG. 6, after when a certain amount is charged, a charging amount per unit time may decrease or be approximately constant. In Case 1, much more electric power amount may be charged for an identical time. From a point of view of an EV charging station operator, in the case that an electric charging procedure is performed for an identical time (e.g., initial 10 hours), an expected profit of Case 1 may be higher than an expected profit of Case 2. Furthermore, in the case that a charging amount of an electric battery is more than a certain amount, an increase in charging amount may be little although a considerable time elapses. Accordingly, in this case, an EV charging equipment is merely occupied for the considerable time, however a profit of a corresponding EV charging station operator may be very little. In summary, in the case that (i) an electric vehicle with a lesser remaining battery power is charged, and (ii) an electric charging process is stopped at a certain charging amount, much more profit may be given to the EV charging station operator.

Meanwhile, if an electric vehicle is fully discharged and does not operate, an EV insurance provider may be required to provide an urgent charging service to an EV user. With respect to an EV insurance provider, a charging state of an electric vehicle (EV) may be required to be sustained over a specific battery power amount such that a full discharge is prevented.

Furthermore, in the case that the number of charge/discharge cycles is over a certain value, a proper charging process may not be performed. The number of battery charge/discharge cycles may affect financial interests of EV battery manufacturers and/or used EV business operators since they have a guarantee obligation for a specific term. With respect to EV battery manufacturers and/or used EV business operators, the reduction of the number of battery charge/discharge cycles may be required.

As described above, different business operators associated with electric vehicles may have different interests. Accordingly, desired requirements and management conditions associated with an SOC management of electric vehicles may differ according to business operators.

FIG. 7 is a graph illustrating a battery performance according to the number of charge/discharge cycles. More specifically, FIG. 7 shows the relationship between a battery capacity and a cycle life.

Most battery manufacturers may set a specific float voltage (e.g., 4.2 V) as the best balance between a battery capacity and a cycle life. As shown in FIG. 7, using 4.2 V as the constant voltage limit (float voltage), a battery may typically deliver about 500 charge/discharge cycles before the battery capacity drops to 80%. Herein, one charge cycle may include a full charge to a full discharge. Multiple shallow discharges may add up to one full charge cycle.

More specifically, as shown in FIG. 7, in the case that a charging voltage is higher, a charging speed of an electric vehicle battery may be faster. However, as the number of charge/discharge cycles increases, a charge terminator voltage may decrease. Particularly, in the case that the number of charge/discharge cycles is over a certain value, a proper charging process may not be performed. In this case, a charge voltage may be dissipated into heat.

As described above, the number of battery charge/discharge cycles may affect financial interests of EV battery manufacturers and/or used EV business operators, since they have a guarantee obligation for a specific term.

FIG. 8 illustrates an example of SOC options in accordance with at least one embodiment.

As shown in FIG. 8, each option may have information on a corresponding SOC management condition and/or corresponding incentive providers. As described in FIG. 5, information on a desired requirement (e.g., charge/discharge conditions) associated with a battery management may be received from each business operator (e.g., an EV charging station operator, an EV insurance provider, etc.). Accordingly, SOC management apparatus 10 may determine a corresponding SOC management condition based on the requirement information received from each business operator. Alternatively, SOC management apparatus 10 may determine a corresponding SOC management condition, based on business characteristics of business operators associated with electric vehicles. For example, the SOC management condition (e.g., 20~80%) of Option 1 may be configured according to an EV charging station operator. The SOC management condition (e.g., 70~100%) of Option 2 may be configured according to an EV insurance provider. The SOC management condition (e.g., 50~90%) of Option 3 may be configured according to a battery manufacturer. The SOC management condition (e.g., 10~90%) of Option 4 may be configured according to a used EV business operator. In other embodiments, when determining the corresponding SOC management condition, at least one of (i) a user convenience, (ii) a driving pattern (e.g., an average driving distance) of an electric vehicle (EV) user, and (iii) a battery management pattern of the electric vehicle (EV) user may be further considered.

For example, if an EV user selects "Option 1," SOC management condition may be set to a range of 20% to 80%" as shown in FIG. 8. In Option 1, the EV user may be required to manage an electric vehicle (EV) battery such that an SOC (i.e., a remaining battery power amount) of a corresponding EV battery is within from 20% to 80%. In this case, a corresponding incentive may be provided by an EV charging station operator. More specifically, in the case that an electric vehicle is charged within a range of 20% to 80% at a corresponding EV charging station, a business operator of the EV charging station may provide an incentive to a corresponding EV user. If an EV user selects "Option 2," SOC management condition may be set to a range of 70% to 100%. In Option 2, the EV user may be required to manage an electric vehicle (EV) battery such that an SOC of a corresponding EV battery is within from 70% to 100%. In this case, a corresponding incentive may be provided by an EV insurance provider. More specifically, in the case that an EV user corresponding to an EV insurance subscriber observes a predetermined SOC management condition, a corresponding EV insurance provider may give an incentive to the EV user. If an EV user selects "Option 3," SOC management condition may be set to a range of 50% to 90%. In Option 3, the EV user may be required to manage an electric vehicle (EV) battery such that an SOC of a corresponding EV battery is within from 50% to 90%. In this case, a corresponding incentive may be provided by a battery manufacturer. If an EV user selects "Option 4," OC management condition may be set to a range of 10% to 90%. In Option 4, the EV user may be required to manage an electric vehicle (EV) battery such that an SOC of a corresponding EV battery is within from 10% to 90%. In this case, a corresponding incentive may be provided by a used EV business operator.

Figure 9:
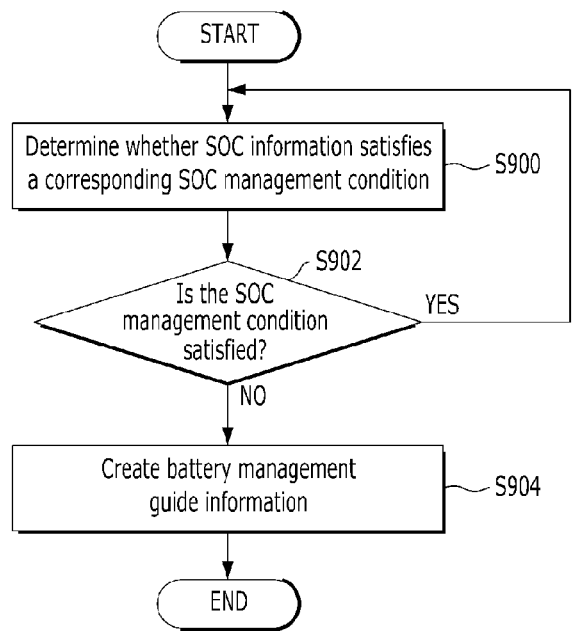
FIG. 9 illustrates a method of providing battery management guide information to an EV user in accordance with at least one embodiment.

FIG. 9 illustrates a method of providing battery management guide information to an EV user in accordance with at least one embodiment. Particularly, FIG. 9 illustrates a procedure (S416) of creating the battery management guide information.

Referring to FIG. 9, at step S900, SOC management apparatus 10 may determine whether the SOC information (i.e., an SOC value) received from electric vehicle (EV) terminal 30 satisfies a corresponding SOC management condition, i.e., whether the SOC information (i.e., an SOC value) is within a range of the corresponding SOC management condition.

At step S904, when the SOC management condition is not satisfied (No—S902), i.e., when the SOC information (i.e., an SOC value) is not within the range of the corresponding SOC management condition, SOC management apparatus 10 may create battery management guide information. Herein, the battery management guide information may include guide information for management of a corresponding EV battery. For example, the battery management guide information may include information on a charge start SOC and/or a charge end SOC. As described in FIG. 4, SOC management apparatus 10 may transmit the created battery management guide information to at least one of user equipment 40 and EV terminal 30, in order to induce an EV user to observe his/her SOC option.

In the case that the determination procedure (S900) of a satisfaction of the SOC management condition is periodically performed, SOC management apparatus 10 may perform the determination procedure (S900) using the latest SOC information (i.e., a recent SOC information) among a plurality of SOC information received (i.e., collected) from EV terminal 30 for a corresponding period.

In other embodiments, although the received SOC information (i.e., SOC value) is within a range of SOC corresponding to an SOC management condition, SOC management apparatus 10 may further determine whether the received SOC value is close to a lower limit value (i.e., a minimum SOC value) or a upper limit value (i.e., a maximum SOC value) of a range of SOC corresponding to the SOC management condition. When the received SOC value is close to the lower limit value or the upper limit value, SOC management apparatus 10 may create battery management guide information. For example, in the case that a range of SOC corresponding to the SOC management condition is from 20% to 80%, when a received SOC value is 23% close to the lower limit value (e.g., 20%), or 78% close to the upper limit value (e.g., 80%), SOC management apparatus 10 may create the battery management guide information.

Meanwhile, when the SOC management condition is satisfied (Yes—S902), i.e., when the SOC information (i.e., an SOC value) is within the range of the corresponding SOC management condition, SOC management apparatus 10 may return to operation S900.

Figure 10:
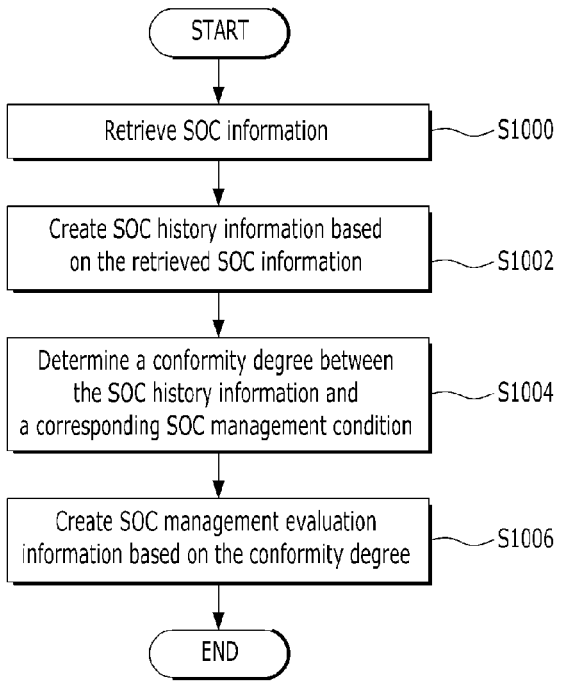
FIG. 10 illustrates a method of providing SOC management evaluation information to business operators in accordance with at least one embodiment.

FIG. 10 illustrates a method of providing SOC management evaluation information to business operators in accordance with at least one embodiment. Particularly, FIG. 10 illustrates a procedure (S416) of creating the SOC management evaluation information. More specifically, the method shown in FIG. 10 may be performed at least one of (i) at a predetermined period (i.e., periodically) and (ii) when a request (i.e., a request for providing SOC management evaluation information) is received from the business operators.

At step S1000, SOC management apparatus 10 may periodically retrieve the stored SOC information (e.g., SOC information collected/stored for a predetermined period) from membership database 23, in order to provide SOC management evaluation information to business operator 14. In other embodiments, when receiving a request (i.e., a request for providing SOC management evaluation information) from business operator 14, SOC management apparatus 10 may retrieve the stored SOC information associated with the request, from membership database 23. More specifically, SOC management apparatus 10 may retrieve SOC information associated with at least one of a requested time period, a requested EV user, a requested battery type (or model), and a requested electric vehicle type (or model).

At step S1002, SOC management apparatus 10 may create SOC history information based on the retrieved SOC information. Herein, the SOC history information may include a battery charging history including information on a charge start SOC and/or a charge end SOC. For example, the SOC history information may be expressed as an SOC range from the charge start SOC to the charge end SOC.

At step S1004, SOC management apparatus 10 may determine a conformity degree between the SOC history information and a corresponding SOC management condition. More specifically, SOC management apparatus 10 may determine the conformity degree based on at least one of (i) whether the SOC history information is within an SOC range corresponding to the SOC management condition, (ii) a proximity degree between charge start SOCs (i.e., a proximity degree between 'a charge start SOC of the SOC history information' and 'a charge start SOC (i.e., a lower limit SOC value) of the corresponding SOC management condition'), and (iii) a proximity degree between charge end SOCs (i.e., a proximity degree between 'a charge end SOC of the SOC history information' and 'a charge end SOC (i.e., a upper limit SOC value) of the corresponding SOC management condition'). For example, in the case that an EV user selects Option 1 (SOC management condition: 20~80%) in FIG. 8, SOC history information corresponding to an SOC range of 23% to 78% may have a higher conformity degree than SOC history information corresponding to an SOC range of 30% to 70%.

At step S1006, SOC management apparatus 10 creates SOC management evaluation information associated with a corresponding electric vehicle (EV) (or an EV battery), based on the determination result (i.e., conformity degree).

Herein, the SOC management evaluation information may include the conformity degree. In other embodiments, SOC management evaluation information may further include at least one of the SOC history information and the collected SOC information.

As described above, the present embodiment may overcome problems of improper management of an electric vehicle battery that lowers the performance and shortens the life-cycle of the battery.

In the case that an electric vehicle (EV) ownership and an EV battery ownership are separated, the management of an EV battery may affect financial interests of business operators (e.g., an owner of an EV battery, a lease service provider associated with an EV battery, etc.) and affiliates thereof (e.g., an EV charging station operator, an EV insurance provider, an EV battery manufacturer, a business operators associated with used electric vehicles, etc.). Accordingly, the present embodiment may provide an efficient battery management scheme associated with EV users and the business operators and affiliates thereof.

Particularly, the present embodiment may provide a way in which other business operators and affiliates on an electric vehicle can induce better management of an electric vehicle battery so that their financial interests on the electric vehicle is preserved.

Furthermore, the present embodiment may enable an electric vehicle user to properly manage an electric vehicle battery so that he or she can use an electric vehicle more efficiently.

As described above, the present embodiment may obtain and analyze driving records of an electric vehicle, and may further set up virtual SOC conditions (i.e., SOC conditions associated with the electric vehicle) which can be used to induce a proper management of the battery of the electric vehicle. Herein, the virtual SOC conditions may be determined based on desired requirements associated with a variety of business operators. Furthermore, the present embodiment may perform an electric vehicle battery management based on the SOC management conditions. In this case, the present embodiment may give benefits to electric vehicle users properly managing an electric vehicle battery, thereby inducing the electric vehicle users to perform a proper management on the electric vehicle battery. Accordingly, in the case that an electric vehicle battery is properly managed, electric vehicles users and a variety of business operators associated with electric vehicles may gain financial benefits.

Particularly, the present embodiment may induce appropriate charging and discharging of an electric vehicle battery, thereby improving an optimal performance of the battery and increasing a life-cycle of the battery.

Furthermore, according to the present embodiment, new business models like leasing an electric vehicle battery may be introduced based on an ownership division that allows managing the battery separately, but not physically detaching it from the electric vehicle.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of managing an electric vehicle battery, the method comprising:
   predetermining a management condition associated with a state of charge (SOC) of the electric vehicle battery, wherein the predetermined management condition includes a predetermined target SOC range;
   collecting SOC information of the electric vehicle battery from an electric vehicle terminal; and
   performing a battery management based on whether the collected SOC information satisfies the predetermined SOC management condition,
   wherein the performing includes:
   obtaining SOC history information by analyzing the collected SOC information, wherein the SOC history information includes information on at least one of an actual charge start SOC and an actual charge end SOC associated with charging of the electric vehicle battery;
   determining a conformity degree of the SOC history information and the predetermined SOC management condition by comparing the actual charge start/end SOC information to the predetermined target SOC range; and
   creating SOC management evaluation information based on the conformity degree; and
   wherein the determining the conformity degree includes:
   determining the conformity degree based on at least one of (i) whether the actual charge start SOC and the actual charge end SOC are within the predetermined target SOC range, (ii) a proximity degree between the actual charge start SOC and a lower limit SOC value of the predetermined target SOC range, and (iii) a proximity degree between the actual charge end SOC and an upper limit SOC value of the predetermined target SOC range.

2. The method of claim 1, wherein the predetermining includes:
providing at least one SOC option to user equipment;
receiving a selection of the at least one SOC option from the user equipment; and
determining the management condition as an SOC management condition corresponding to a selected SOC option.

3. The method of claim 2, wherein the at least one SOC option is determined based on at least one of a driving pattern and a battery management pattern of a corresponding user.

4. The method of claim 3, wherein the battery management pattern is determined based on a corresponding SOC management history.

5. The method of claim 1, wherein the performing includes:
determining whether the collected SOC information is within the predetermined target SOC range;
creating a battery management guide information when the collected SOC information is not within the predetermined target SOC range; and
transmitting the battery management guide information to at least one of user equipment and the electric vehicle terminal.

6. The method of claim 5, wherein the battery management guide information includes at least one of a charge start SOC and a charge end SOC to be applied for charging of the electric vehicle battery.

7. The method of claim 1, wherein the performing includes:
transmitting the SOC management evaluation information to a corresponding business operator system.

8. The method of claim 7, wherein the creating the SOC management evaluation information is performed at least one of (i) at a predetermined period and (ii) when a request is received from the corresponding business operator system.

9. The method of claim 7, comprising:
determining at least one of an incentive and a penalty for a corresponding user according to the conformity degree; and
transmitting the at least of the incentive and the penalty, to at least one of the corresponding business operator system and user equipment.

10. An apparatus for managing an electric vehicle battery, the apparatus comprising:
a management condition determining processor configured to predetermine a management condition associated with a state of charge (SOC) of the electric vehicle battery, wherein the predetermined management condition includes a predetermined target SOC range;
an SOC information collecting processor configured to collect SOC information of the electric vehicle battery from an electric vehicle terminal; and
an SOC management processor configured to create at least one of a battery management guide information and an SOC management evaluation information by comparing the SOC information and the predetermined SOC management condition,
wherein the SOC management processor is configured to:
obtain SOC history information by analyzing the collected SOC information, wherein the SOC history information includes information on at least one of an actual charge start SOC and an actual charge end SOC associated with charging of the electric vehicle battery;
determine a conformity degree of the SOC history information and the predetermined SOC management condition by comparing the actual charge start/end SOC information to the predetermined target SOC range; and
create the SOC management evaluation information based on the conformity degree; and
wherein the conformity degree is determined based on at least one of:
(i) whether the actual charge start SOC and the actual charge end SOC are within the predetermined target SOC range;
(ii) a proximity degree between the actual charge start SOC and a lower limit SOC value of the predetermined target SOC range; and
(iii) a proximity degree between the actual charge end SOC and an upper limit SOC value of the predetermined target SOC range.

11. The apparatus of claim 10, further comprising:
an information providing processor configured to:
(i) transmit the battery management guide information to at least one of user equipment and the electric vehicle terminal; and
(ii) transmit the SOC management evaluation information to a corresponding business operator system.

12. The apparatus of claim 10, wherein the battery management guide information includes at least one of a charge start SOC and a charge end SOC to be applied for charging of the electric vehicle battery.

13. The apparatus of claim 10, wherein the battery management guide information is created when the collected SOC information is not within the predetermined target SOC range.

* * * * *